United States Patent
Raffoni (12)

(10) Patent No.: US 6,250,191 B1
(45) Date of Patent: Jun. 26, 2001

(54) SHEARING ASSEMBLY FOR CROPPING MACHINES

(76) Inventor: Giuseppe Raffoni, Via D. Bolognesi, 24 - 47100 Forli' (IT)

( * ) Notice: Subject to any disclaimer, the term of this patent is extended or adjusted under 35 U.S.C. 154(b) by 0 days.

(21) Appl. No.: 09/261,178

(22) Filed: Mar. 3, 1999

(30) Foreign Application Priority Data

Mar. 3, 1998 (IT) ............................................. UD98A0031

(51) Int. Cl.[7] .............................. B23D 19/00; B26D 1/14; B27B 5/29
(52) U.S. Cl. ........................... 83/471.3; 83/473; 83/486.1
(58) Field of Search .................... 83/471.2, 487, 83/483, 484, 486, 485, 486.1, 490, 644, 113, 107, 473, 471.3

(56) References Cited

U.S. PATENT DOCUMENTS

| | | | |
|---|---|---|---|
| 1,636,924 | * | 7/1927 | Porter ...................................... 83/473 |
| 3,344,819 | * | 10/1967 | Mitchell ............................... 83/471.3 |
| 3,540,338 | * | 11/1970 | McEwan et al. ....................... 83/490 |
| 3,709,075 | * | 1/1973 | Goellner ................................. 83/113 |
| 3,752,023 | * | 8/1973 | Allison et al. ......................... 83/113 |
| 3,854,360 | | 12/1974 | Reed ................................... 83/471.3 |
| 3,865,161 | * | 2/1975 | Vizziello et al. .................... 83/471.2 |
| 3,878,744 | | 4/1975 | Luxnat .................................... 83/113 |
| 3,888,152 | * | 6/1975 | Barton ................................. 83/471.3 |
| 4,064,920 | * | 12/1977 | Piche ................................... 83/471.2 |
| 4,090,540 | * | 5/1978 | Smith et al. ......................... 83/471.2 |
| 4,208,934 | * | 6/1980 | Wall ....................................... 83/490 |
| 4,243,082 | * | 1/1981 | Paris, Jr. et al. ........................ 83/484 |
| 4,581,967 | * | 4/1986 | Ehm et al. ........................... 83/471.2 |
| 5,791,223 | * | 9/1998 | Lanzer ................................ 83/471.3 |

* cited by examiner

*Primary Examiner*—Kenneth E. Peterson
*Assistant Examiner*—Stephen Choi
(74) *Attorney, Agent, or Firm*—Antonelli, Terry, Stout & Kraus, LLP

(57) ABSTRACT

Shearing assembly (10) for cropping machines (11) suitable to shear elements made of wood, plastic, metal, alloys or otherwise, shaped as rods (13) or sheet and placed on a work plane (11a). The shearing assembly includes at least a movable trolley (14) supporting at least a rotary blade (12) constrained to a supporting structure (15) of the cropping machine (11) by at least one guide (16), the movable trolley (14) moving alternately from an inactive position, wherein the blade does not come into contact with the work plane (11a), to a working position wherein the blade (12) comes into contact with the work plane (11a) to carry out the shearing operation. The movable trolley (14) cooperates with at least a main actuator (18), suitable to generate on the movable trolley (14), during its outward travel from the inactive position to the working position and/or during its return travel, a torque component which modifies the trajectory of the blade (12) with respect to the work plane (11a) between the outward travel and the return travel. At least one component of either the supporting structure (15) or the guide has characteristics of at least partial elastic flexibility so as to allow the movable trolley (14) to oscillate when it is stressed by the torque component.

9 Claims, 3 Drawing Sheets

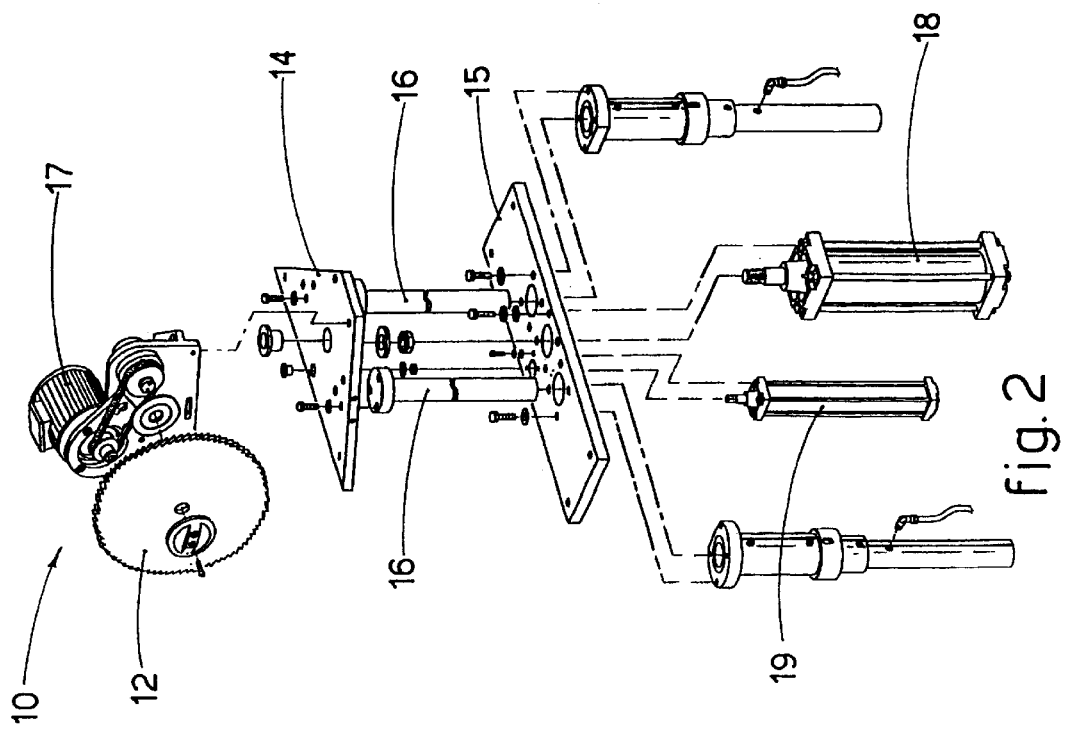
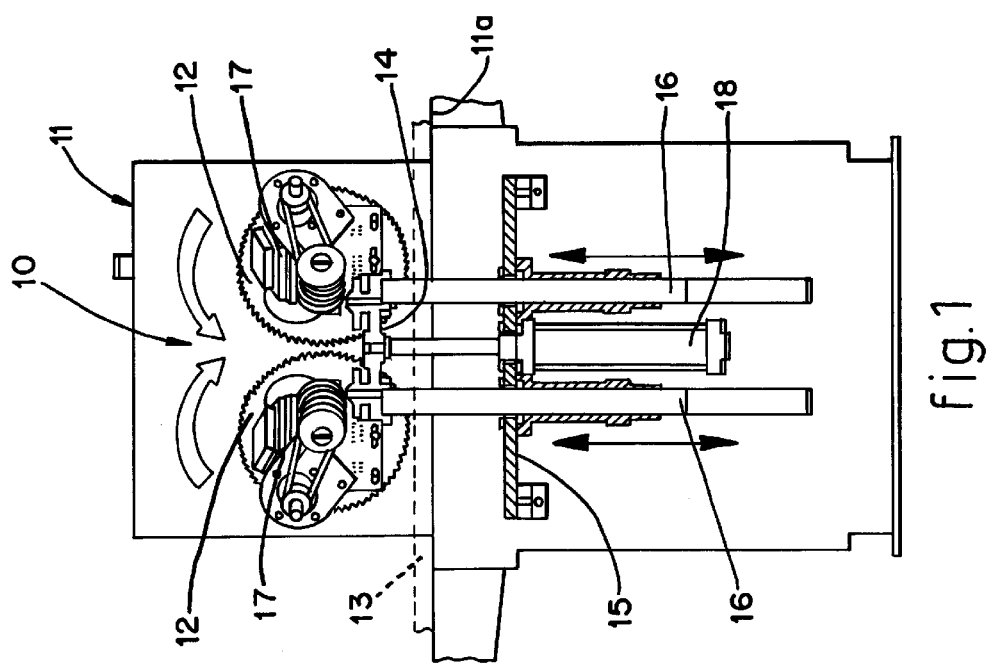

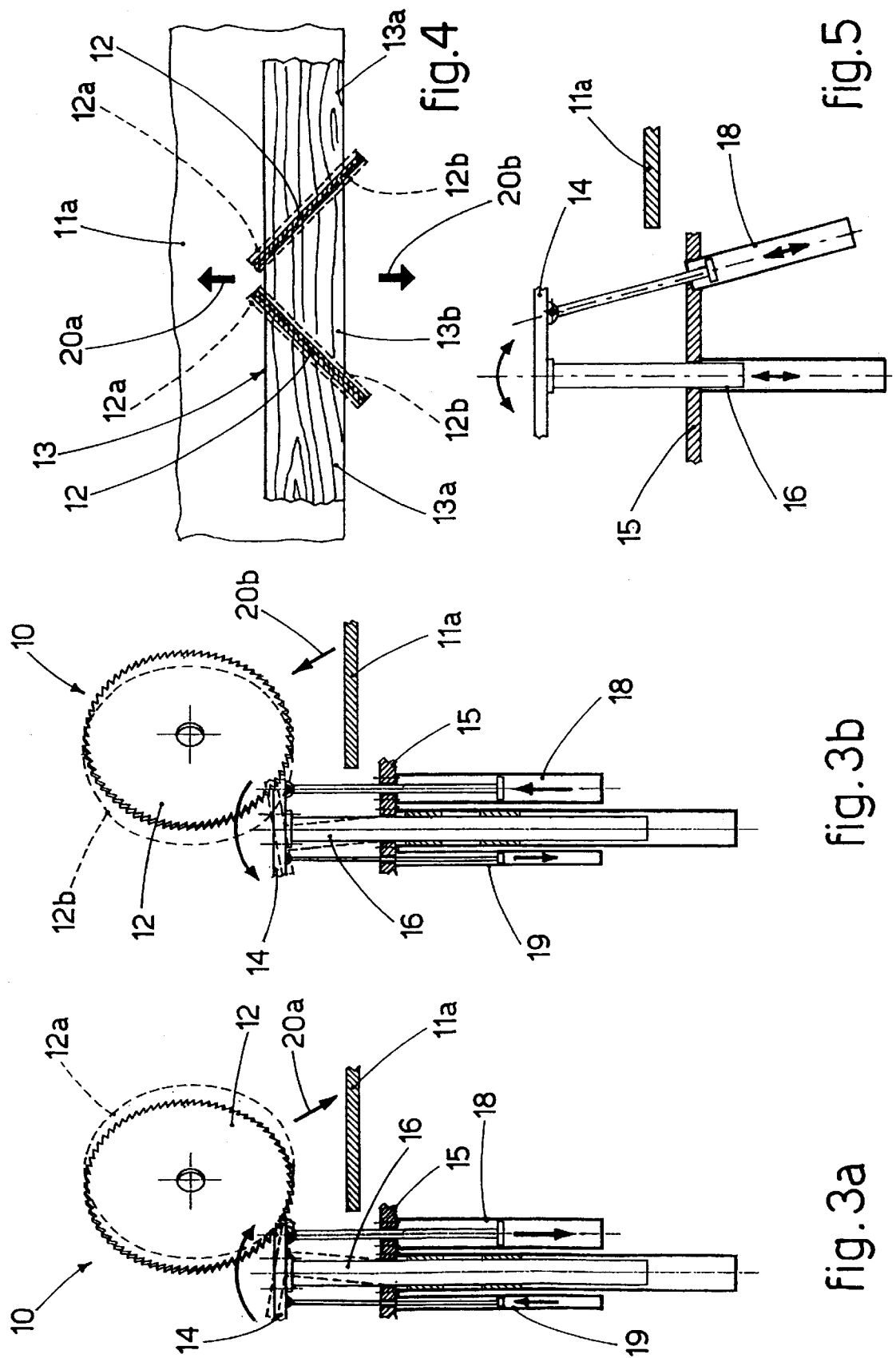

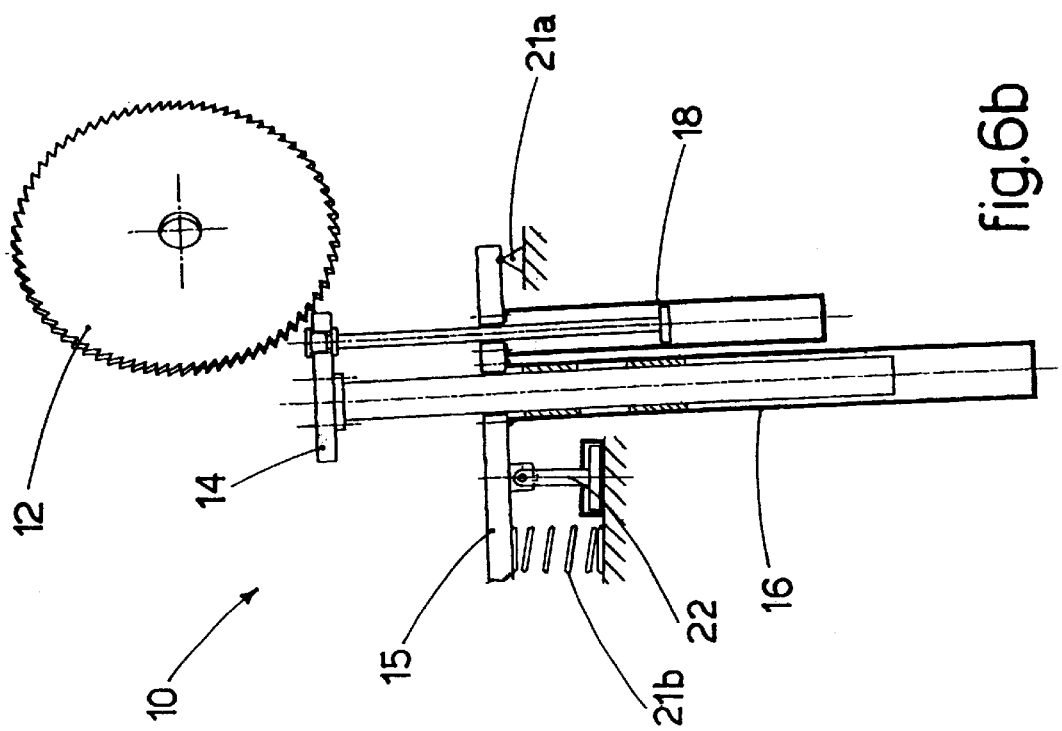
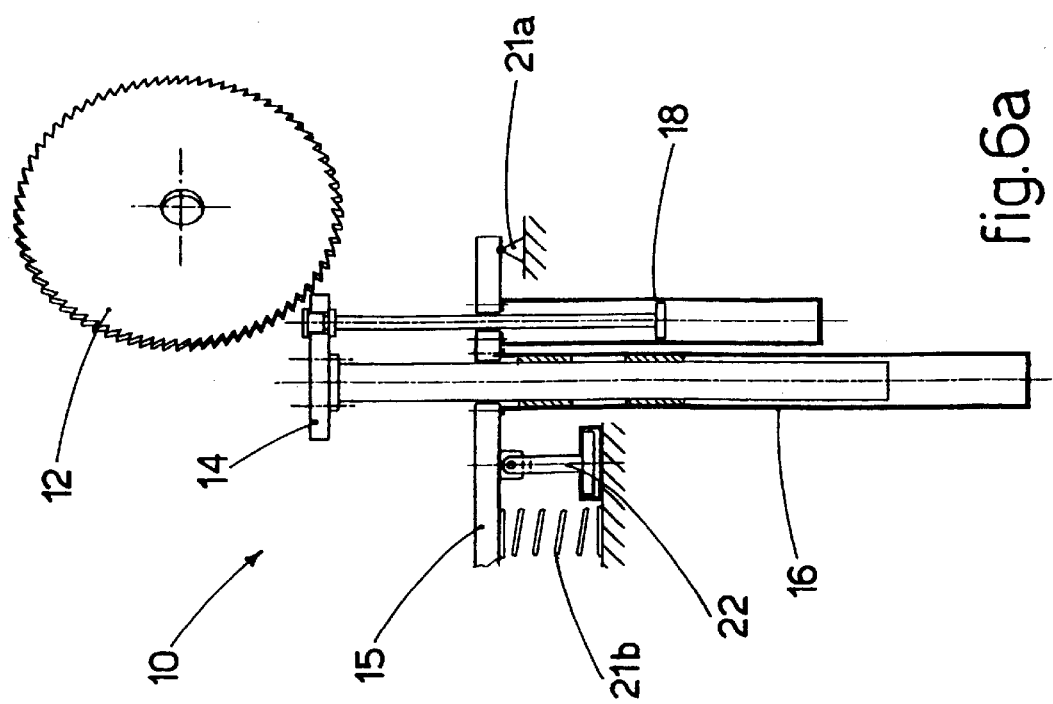

SHEARING ASSEMBLY FOR CROPPING MACHINES

FIELD OF THE INVENTION

This invention concerns a shearing assembly for cropping machines.

The invention is employed in automatic cropping machines suitable to shear elements shaped as rods or sheet, made of wood, plastic, metal, alloys or other suitable material.

The invention is particularly suitable, but not only, to be applied on double-bladed cropping machines which make two simultaneous cuts, of the type used to make frames for windows and doors, paintings or furnishing elements.

In the following description we shall refer to this specific use of the invention, although it can be used on other types of cropping machines, such as for example those with a single blade or those which are used to shear metallic foil, for example sheets of aluminium or similar.

BACKGROUND OF THE INVENTION

In the field of shearing machines, the state of the art includes cropping machines used to make frames for windows and doors, paintings or furniture; these machines are used to cut to size the elements which make up the frame, starting from a rod or continuous strip made of wood or similar material.

These cropping machines comprise a supporting structure with a horizontal work plane on which the rods which are to be cut are placed and fed forwards.

A shearing assembly is associated with the supporting structure and comprises a movable trolley supporting the blade or blades, or comprises as many movable trolleys as there are blades to move.

The blades can assume at least a working position, wherein they are taken into contact with the work plane where the rods are placed, in order for shearing to be carried out, and an inactive position wherein they are distanced from the work plane and are repositioned for the start of the next cycle. The blades have a shearing position lying on a plane substantially orthogonal to the work plane and angled at 45° with respect to the axis of feed of the rod to be sheared, so that they make a sloping cut on the rod; they are also arranged at an angle of 90° with respect to each other, so as to make two simultaneous and specular cuts of 45°.

The shearing assembly can travel in a pendular manner, if the shearing assembly follows an arched trajectory with a centre of rotation outside the work plane, or in a linear manner if it follows a rectilinear trajectory substantially orthogonal to the work plane.

The problem with state of the art cropping machines is that both in the ascent step and in the descent step the blades follow the same trajectory. This means that the sides of the blades, as they ascend, rub against the cut edges of the pieces resting on the work plane and clamped upstream and downstream of the shearing assembly.

This rubbing action can be even more harmful if there is even a little displacement of the two elements of the rod separated by the cutting action due to the release of tensions in the rod as it is cut. The rubbing damages the pieces, both in terms of lesions on the cut edge, and also in terms of scratches on the paint or the decorations.

The continuous rubbing of the sides of the blades may also cause them to wear prematurely, and the quality of the cut to deteriorate, so that the blades need to be replaced very frequently.

This same problem occurs substantially in every type of shearing machine comparable to the one described above, for example in shearing machines where the shearing assembly is movable horizontally, such as those used to shear to size metallic foils or sheets or metallic alloys.

The present applicant has designed, tested and embodied this invention to overcome the shortcomings of the state of the art and to obtain further advantages.

SUMMARY OF THE INVENTION

The invention is set forth and characterised in the main claim, while the dependent claims describe other characteristics of the main embodiment.

The purpose of the invention is to achieve a shearing assembly for cropping machines which, during the step when the blades are repositioned in the starting position, will allow the blades to pass in a position which does not come into contact with the cut edges of the pieces, thus preventing reciprocal damage.

The shearing assembly according to the invention comprises one or more blades mounted on a single movable trolley, or on as many movable trolleys as there are blades.

The shearing assembly includes means to move the at least one movable trolley; said movement means cooperate with mating guide means which create the constraint between the movable trolley and the supporting structure of the cropping machine and define the outward travel and return travel during the shearing cycle.

According to a first embodiment of the invention, the guide means include characteristics of at least partial elastic flexibility which allow the movable trolley to perform an elastic transverse movement, although limited, during its outward travel and return travel, if stressed by a force component which does not act on its centre of gravity.

When the stress is finished, the guide means are suitable to elastically resume their starting position.

According to another embodiment, when stressed by a torque component, the elastic transverse movement of the movable trolley is possible because the supporting structure of the shearing assembly is able to at least partly oscillate, for example in correspondence with an articulated clamping point or an at least partly elastic point.

According to the invention, the movement means are suitable to generate, either alone or in combination with the flexible guide means or the partly elastic clamp of the supporting structure, a torque applied to the movable trolley which causes it to move towards/away from the work plane.

These movements are correlated to the descent and/or ascent steps of the movable trolley, and are made possible by the partial flexibility of the guide means or the supporting structure. The movements make possible to define two different transit trajectories of the blades, one for the outward travel of the movable trolley and one for the return travel thereof.

In this way, the circular blades, during their return travel, pass in a position where they do not come into contact with the cut edges, so that the latter are not damaged.

When the stress caused by the activation of the movement means has ended, the elastic deformation of the guide means or the supporting structure is annulled and the movable trolley returns to its correct start-of-cycle and end-of-cycle position.

The entity of the deviation in the trajectory of the blades with respect to the normal trajectory without any torque applied can be regulated according to the working parameters such as the thickness of the blades, thickness of the rods, cycle speed, length of travel, etc., and must be correlated to the structural flexibility of the guide means or the supporting structure.

In one embodiment of the invention, the movement means consist of a pair of actuators, one prevailing over the other, constrained to the movable trolley at two points, advantageously symmetrical with respect to the position of the guide means and acting reciprocally in alternation, that is to say, while one is extending the other is contracting and vice versa.

The actuators are suitable to generate on the movable trolley a first torque in the outward travel step which takes the blades closer to the work plane, and a second torque, in the opposite direction to the first, during the return travel when the blades are distanced from the work plane.

The alternate activation of the two actuators causes the shearing assembly to descend and ascend, generating a tilting torque component on the movable trolley which causes a displacement in the opposite direction with respect to the work plane.

According to a variant, one of the two actuators is activated only in one of the two steps, either outward or return, of the operating cycle of the shearing assembly so as to generate the desired torque defining the modification to the trajectory between the outward travel and return travel.

According to a variant, instead of one of the two actuators there is a shock absorber or other similar contrasting element, such as for example a hydraulically braked cylinder, which acts on a point of the movable trolley opposite the point at which the lifting/lowering actuator is applied.

According to another variant, instead of the contrasting actuator, the shearing assembly has sliding guide means, at least partly braked, such as will generate, together with the main lifting/lowering actuator, a tilting torque on the moving trolley.

According to a further variant, the shearing assembly has guide means associated at a misaligned position with respect to the centre of gravity of the movable trolley cooperating with a single lifting/lowering actuator.

To be more exact, the torque in this case is generated by the weight force of the motor located on the movable trolley and the thrust force of the lifting actuator; the said thrust force is applied on the movable trolley at a different point, advantageously opposite the guides, from that where the weight force of the said motor is applied.

The two opposing forces acting on the movable trolley generate the torque component needed to distance the shearing blades from/bring the shearing blades near the cut section, elastically bending the guide columns on which the movable trolley runs.

According to another variant, the movement means comprise a single actuator with an axis of activation inclined with respect to the axis of the guide means, that is to say, the direction of movement of the movable trolley.

According to a further variant, the guides themselves on which the movable trolley runs act as a lifting/lowering actuator.

The invention therefore makes it possible, in times which are substantially equivalent to those of conventional shearing assemblies, to carry out shearing operations which are optimum in quality, without damaging the finished pieces or the rod which is to be cut. Moreover, the blades are subject to less wear, inasmuch as they only rub against the waste piece, which generates nearly no friction between the parts.

BRIEF DESCRIPTION OF THE DRAWINGS

The attached Figures are given as a non-restrictive example, and show some preferred forms of embodiment of the invention wherein:

FIG. 1 is a partial and front view of a double-bladed cropping machine equipped with a shearing assembly according to the invention;

FIG. 2 is a part exploded view of the shearing assembly shown in FIG. 1;

FIGS. 3a and 3b show in diagram form a side view of the shearing assembly according to the invention respectively in the descent step and the ascent step;

FIG. 4 shows in diagram form a view from above of the positions of the circular blades of the shearing assembly according to the invention in the different operating steps;

FIG. 5 is a diagram of a variant of the shearing assembly according to the invention;

FIGS. 6a and 6b show diagrams of another embodiment of the invention.

DETAILED DESCRIPTION OF PREFERRED EMBODIMENT

With reference to the attached drawings the reference number 10 denotes generally the shearing assembly according to the invention of a double-bladed cropping machine 11, partly shown in FIG. 1, suitable to shear to size rods 13, used to make frames for doors and windows, paintings or furnishing elements.

The rods 13 advance on a horizontal work plane 11a of the double-bladed cropping machine 11 to perform the shearing operations.

The shearing assembly 10 comprises a pair of circular rotary blades 12 lying on vertical planes angled by 45° with respect to the longitudinal axis of the rods 13 and reciprocally angled by 90°.

The circular blades 12 are driven by respective electric motors 17 and are mounted, in this case, on the same movable trolley 14 constrained to a stationary supporting structure 15 of the double-bladed cropping machine 11 by means of a pair of guides 16 arranged symmetrically.

The guides 16, in this specific case, have characteristics of at least partly elastic flexibility if subjected to an outside tilting stress.

The movable trolley 14 is associated with a main drawing/thrusting actuator 18 which defines the vertical linear movement thereof.

In this case of FIGS. 1–3b, the movable trolley 14 is also associated with a contrasting actuator 19 located advantageously in a position symmetrically opposite the main actuator 18 with respect to the guides 16.

The main actuator 18 prevails over the contrasting actuator 19.

The operating cycle of the shearing assembly 10 includes a descent step wherein the movable trolley 14, due to the effect of the action of the main actuator 18, takes the circular blades 12 from an inactive position, wherein they are arranged above the work plane 11a, to a working position wherein the circular blades 12 come into contact with the work plane 11a, and are inserted into grooves made on the work plane 11a for this purpose, so that a double, specular cut can be made on the rod 13.

Later on in the operating cycle, the movable trolley 14 performs an ascending step wherein the circular blades 12, due to the action of the main actuator 18, return to their initial, inactive position.

According to the invention, in at least one of the two steps of the operating cycle of the shearing assembly 10, the contrasting actuator 19 is activated in a coordinated manner with the main actuator 18 so as to create a torque component which, due to the effect of the flexibility of the guides 16, causes a slight inclination of the movable trolley 14 and therefore a transit trajectory of the circular blades 12, with respect to the rod 13, which is different from the normal trajectory of a linear vertical displacement of the shearing assembly 10.

In the embodiment shown in FIGS. 3*a* and 3*b*, during the descending step of the shearing assembly (FIG. 3*a*), the main actuator 18 draws on the movable trolley 14 and makes it descend, while the contrasting actuator 19 thrusts it upwards, with a thrust which is less than the drawing force exerted by the main actuator 18.

The torque created by the combined action of the two actuators 18, 19 causes the movable trolley 14 to approach the work plane 11*a* in a transverse direction, as shown by the reference number 20*a*; at the same time there is an elastic bending of the guides 16 and an inclination of the movable trolley 14 which assume the deliberately emphasized position which is shown with a line of dashes. The circular blades 12 therefore also assume a position 12*a* which is more advanced towards the work plane 11*a* in order to shear the rod 13 (FIGS. 3*a* and 4).

At the end of the descending step, the actuators 18, 19 stop their travel and this causes the guides 16 to return elastically to the vertical position and therefore the movable trolley 14 and the circular blades 12 to return to their normal end-of-travel position.

During the ascent of the shearing assembly 10 (FIG. 3*b*), the main actuator 18 thrusts the movable trolley 14 upwards, while the contrasting actuator 19 draws it downwards.

The torque thus generated causes the movable trolley 14 to retreat in a transverse direction (indicated by the reference number 20*b*) from the work plane 11*a*, making the guides 16 bend and inclining the movable trolley 14 as shown by the line of dashes.

During this step, the circular blades 12 assume a position 12*b* which is more distanced from the work plane 11*a* compared with their normal position (FIGS. 3*b* and 4), following a transit trajectory which is different from that followed in the descending step.

This trajectory therefore prevents the circular blades 12 from rubbing on the edges of the rod 13 which is to be cut and on the finished piece/pieces 13*a*, thus preventing any damage to them.

During the ascent step, the circular blades 12 come into contact only with the waste piece 13*b* arranged between them, but this is not clamped on the work plane 11*a* and is therefore thrust without offering any resistance, and therefore the friction between the parts is negligible.

The circular blades 12 are therefore subjected to less wear, and thus they last longer in efficient working condition.

At the end of this ascending step, the guides 16 are no longer stressed by the actuators 18, 19, so they again elastically resume their normal vertical position, and the trolley 14 and the circular blades 12 return to the starting position.

According to a variant, the contrasting actuator 19 is activated only in one of the two steps, either descent and/or ascent, of the shearing assembly 10 to generate the desired torque on the movable trolley 14.

In this embodiment too, the return trajectory of the circular blades 12 is laterally displaced with respect to the original trajectory, preventing the circular blades 12 from rubbing against the cut edges.

According to a variant which is not shown here, instead of the contrasting actuator 19 there is a shock absorber element which contrasts the thrust of the main actuator 18 in the descent and/or ascent step of the shearing assembly 10, generating a tilting torque on the movable trolley 14 which displaces it from its normal trajectory.

According to another variant, the torque is generated by the action of a single actuator in combination with guides 16 arranged eccentrically with respect to the centre of gravity of the movable trolley 14.

In another embodiment, the torque applied to the movable trolley 14 is generated by providing guides 16 suitable to generate a component of resistant friction which contrasts the drawing/thrust action of the main actuator 18, generating a torque in a direction correlated to the direction in which the main actuator 18 moves. According to a variant, the component of resistant friction induced by the guides 16 can be excluded in one of the two steps, descent or ascent, of the movable trolley 14, since the torque is only generated in the step when the friction component is activated.

In the variant shown in FIG. 5, the movable trolley 14 is associated with a main actuator 18 arranged at an angle with respect to the guide 16 and therefore not parallel to the normal trajectory of the said movable trolley 14.

This angled arrangement causes the thrust generated by the main actuator 18 to be de-composed into two components, a vertical component which causes the lifting/lowering of the movable trolley 14 according to the constraint consisting of the guides 16, and a horizontal component which generates the desired movement to move the blades nearer to/farther from the work plane 11*a*.

The invention, which makes possible to carry out cropping operations which are of optimum quality without any modification whatsoever to the times of the cycle, can be applied also in the event that each circular blade 12 is associated with a relative movable trolley 14.

The variant shown in FIGS. 6*a* and 6*b* shows the embodiment wherein the guides 16 are rigid and it is the supporting structure 15 which is attached in such a manner that it can elastically facilitate the displacement of the movable trolley 14 when it is stressed by a component of tilting torque.

In this specific case, which is given only as an example, the plate constituting the supporting structure 15 is rigidly hinged on one side with means 21*a* and is attached on the other side with elastic means, in this case represented as an example by a repositioning spring 21*b* and a pneumatic actuator 22.

It is within the scope and spirit of the invention to replace the spring 21*b* with rubber elements, pneumatic cylinders, shock absorbent brakes and similar elements.

The actuator 18 in this case provides to apply a rigid rotation to the whole structure around the axis of the hinge 21*a*.

During the shearing operation (FIG. 6*a*), the supporting structure 15 is substantially horizontal while during the return step (FIG. 6*b*) the supporting structure 15 is angled so as to allow the circular blade 12 not to come into contact with the cut section.

When the stress exerted by the actuator 18 is finished, the supporting structure 15 is returned to a substantially horizontal position by the repositioning spring 21*b*.

What is claimed is:

1. Shearing assembly for cropping machines suitable to shear elements shaped as rods or sheet and placed on a work plane, the shearing assembly comprising at least a movable trolley supporting at least a rotary blade constrained to a supporting structure of the cropping machine by at least one guide, the movable trolley moving alternately from an inactive position, wherein the blade does not come into contact with an element to be sheared on the work plane, to a working position wherein the blade comes into contact with the element to be sheared on the work plane to carry out the shearing operation, the movable trolley cooperating with movement means comprising at least a main actuator for generating on the movable trolley, during at least one of outward travel of the movable trolley from the inactive position to the working position and return travel of the movable trolley from the working position to the inactive position, a torque component which modifies a trajectory of the blade with respect to the work plane between the outward travel and the return travel, and in that at least one component either of the supporting structure or the at least one guide has characteristics of at least partial elastic flexibility so as to allow the movable trolley to oscillate when it is stressed by the torque component.

2. Shearing assembly as in claim 1, characterised in that the at least one guide is at least partly flexible transversely to its axis.

3. Shearing assembly as in claim 1, characterised in that the guide means also comprise at least a contrasting actuator constrained to the movable trolley in a position opposite the main actuator with respect to at least one guide, the actuators alternately drawing/thrusting on the movable trolley.

4. Shearing assembly as in claim 3, characterised in that the contrasting actuator is active during both outward and return travel of the movable trolley.

5. Shearing assembly as in claim 3, characterised in that the contrasting actuator is active only in either the outward travel or return travel of the movable trolley.

6. Shearing assembly as in claim 1, characterised in that the movement means further comprise the at least one guide which causes friction resistant to the movement of the movable trolley.

7. Shearing assembly as in claim 1, characterised in that it comprises a single movable trolley with a pair of rotary blades arranged at an angle to each other of 90° and including a shearing position lying on a vertical plane inclined with respect to the longitudinal axis of the element to be cut.

8. Shearing assembly as in claim 1, characterised in that the movable trolley moves on a substantially vertical plane orthogonal to the work plane.

9. Shearing assembly as in claim 1, characterised in that the movable trolley moves on a substantially horizontal plane parallel to the work plane.

* * * * *